United States Patent Office 3,095,412
Patented June 25, 1963

3,095,412
9α,11α - EPOXY AND 11β - CHLORO-9α-HYDROXY 17α - (2 - CARBOXYETHYL) - 17β - HYDROXYANDROST-4-EN-3-ONE γ-LACTONES AND Δ¹ AND Δ⁶ ANALOGS
Edward A. Brown, Wilmette, Ill., assignor to G. D. Searle & Co., Chicago, Ill., a corporation of Delaware
No Drawing. Filed Dec. 19, 1961, Ser. No. 160,633
6 Claims. (Cl. 260—239.57)

This invention relates to 9α,11α-epoxy and 11β-halo-9α-hydroxy 17α-(2-carboxyethyl)-17β-hydroxyandrost-4-en-3-one γ-lactones and the Δ¹ and Δ⁶ analogs thereof, as also processes whereby these products can be prepared. More particularly, this invention relates to new and useful pure chemical compounds having, in the case of the epoxides, the formula

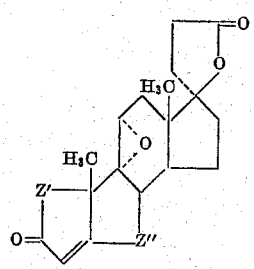

and, in the case of the halohydrins, the formula

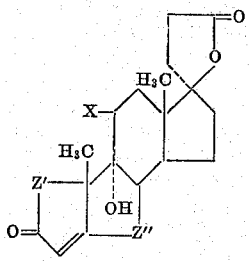

in which formulas Z' and Z" each represents an ethylene or vinylene radical and X represents halogen, especially chlorine.

Equivalent to the foregoing lactones for the purposes of this invention are the corresponding hydroxy acids and their alkali salts of the formulas

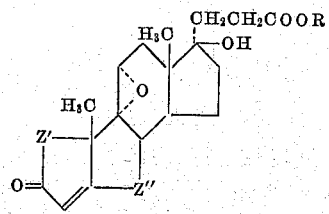

and

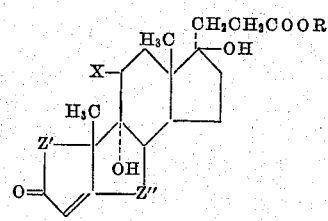

wherein Z', Z", and X are defined as before and R represents hydrogen, an alkali metal, or the ammonium radical.

The compounds to which this invention relates are useful because of their valuable pharmacological properties.

Thus, for example, they block the effect of desoxycorticosterone acetate on urinary sodium and potassium. This effect is especially unexpected in the epoxy compounds comprehended, since isomers thereof represented by 17α-(2 - carboxyethyl)-9β,11β-epoxy-17β-hydroxyandrost-4-en-3-one γ-lactone are relatively inactive as desoxycorticosterone acetate blockers under substantially identical conditions of test.

Preparation of the instant lactones proceeds from the 17α - (2 - carboxyethyl)-17β-hydroxyandrosta-4-9(11)-dien-3-one γ-lactones

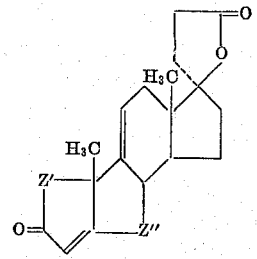

which, upon oxidation with perbenzoic acid in anhydrous benzene, afford the corresponding epoxy compounds hereof

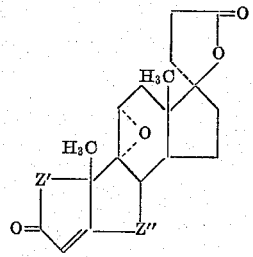

the latter compounds, in turn, being converted on contact with concentrated hydrohalic acid in dichloromethane to the claimed halohydrins

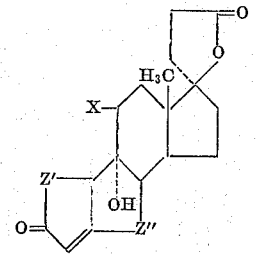

Z', Z", and X in the formulas retaining the meanings previously assigned.

Those skilled in the art will appreciate that the salts set forth readily devolve from the apposite lactones on contact with aqueous alkali, and the free acids are obtained from the salts by a critically brief exposure to a proton source. Prolongation of the epoxsure time induces lactonization.

The following examples describe in detail compounds illustrative of the present invention and methods whereby these compounds can be prepared. However, the invention is not to be construed as limited thereby, either in spirit or in scope, since it will be apparent to those skilled in the art of organic chemistry that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*17α-(2-carboxyethyl)-9α,11α - epoxy - 17β - hydroxyandrost-4-en-3-one γ-lactone.*—To a solution of 27 parts of 17α-(2-carboxyethyl)-17β-hydroxyandrosta-4,9(11)-diene-3-one γ-lactone—preparable as described in U.S. 2,925,416—in 450 parts of anhydrous benzene is added a solution of approximately 17 parts of perbenzoic acid in 180 parts of anhydrous benzene, temperatures of the order of 5° being maintained throughout the addition and for 24 hours thereafter. The reaction mixture is then allowed to stand at room temperatures for 48 hours, whereupon 460 parts of hexane is introduced and the resultant mixture chilled to induce crystallization. The crystals thrown down are filtered off and recrystallized from acetone to afford colorless 17α-(2-carboxyethyl)-9α,11α-epoxy-17β-hydroxyandrost-4-en-3 - one γ-lactone melting at 258–262° with decomposition. The product has the formula

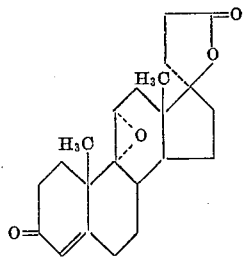

EXAMPLE 2

*17α-(2-carboxyethyl)-11β-chloro-9α-17β - dihydroxyandrost-4-en-3-one γ-lactone.*—To a solution of 1 part of 17α-(2-carboxyethyl)-9α,11α-epoxy-17β - hydroxyandrost-4-en-3-one γ-lactone in 80 parts of dichloromethane is added 71 parts of concentrated hydrochloric acid. The resultant biphasic mixture is maintained with vigorous agitation at room temperatures for 15 minutes, whereupon it is allowed to layer out and the lower layer is separated, successively washed with water, aqueous 2% potassium bicarbonate, and water. The solution thus obtained is dried over anhydrous sodium sulfate and stripped of solvent by distillation, affording as the residue 17α-(2-carboxyethyl)-11β-chloro-9α,17β-dihydroxyandrost-4-en-3-one γ-lactone which, upon recrystallization from ethyl acetate, melts at 187–190° with decomposition. The product has the formula

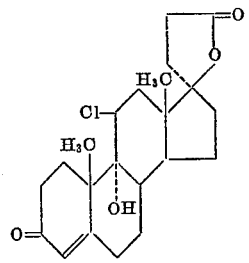

EXAMPLE 3

(A) *17α-(2-carboxyethyl)-17β-hydroxyandrosta-1,4,9(11)-trien-3-one γ-lactone.*—A mixture of 10 parts of 17α-(2-carboxyethyl)-17β-hydroxyandrosta-4,9(11)-dien-3-one γ-lactone, approximately 8 parts of 2,3-dichloro-5,6-dicyanobenzoquinone, and 225 parts of anhydrous benzene is maintained at the boiling point under reflux with agitation for 24 hours. It is then cooled to room temperature and filtered. The filtrate is diluted with approximately 70 parts of ether and washed with 400 parts of aqueous 2% sodium sulfite. It is then filtered through diatomaceous earth, washed well with water, dried over anhydrous sodium sulfate, and freed of solvent by distillation. The residue, crystallized from methanol, affords 17α-(2-carboxyethyl)-17β-hydroxy-androsta-1,4,9(11)-trien-3-one γ-lactone melting at 86–90°.

(B) *17α-(2-carboxyethyl)-9α,11α-epoxy-17β-hydroxyandrosta-1,4-dien-3-one γ-lactone.*—A solution of 10 parts of 17α-(2-carboxyethyl)-17β-hydroxyandrosta-1,4,9(11)-trien-3-one γ-lactone and 6 parts of perbenzoic acid in 240 parts of anhydrous benzene is maintained at 5° for 96 hours and then let stand at room temperatures for 24 hours. Approximately 244 parts of hexane is thereupon added, inducing crystallization. The crystals are filtered off, washed with hexane, and successively recrystallized from ethyl acetate and a mixture of acetone and hexane to give 17β-(2-carboxyethyl)-9α,11α-epoxy-17β-hydroxyandrosta-1,4-dien-3-one γ-lactone melting at 250–255° with decomposition. The product has the formula

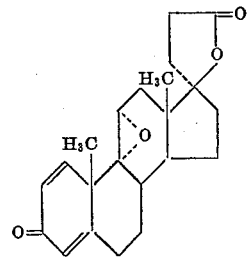

EXAMPLE 4

*17α-(2-carboxyethyl)-11β-chloro-9α,17β - dihydroxyandrosta-1,4-dien-3-one γ-lactone.*—To a solution of 3 parts of 17α-(2-carboxyethyl)-9α,11α-epoxy - 17β - hydroxyandrosta-1,4-dien-3-one γ-lactone in 268 parts of dichloromethane is added 240 parts of concentrated hydrochloric acid. The resultant biphasic mixture is maintained with vigorous agitation at room temperatures for 15 minutes and then let stand to layer out. The lower layer is separated; successively washed with water, aqueous 2% potassium bicarbonate, and water; dried over anhydrous sodium sulfate; and stripped of solvent by distillation. Addition of approximately 20 parts of methanol to the residue causes it to solidify. The solid material, twice recrystallized from ethyl acetate, affords 17α-(2-carboxyethyl)-11β-chloro-9α,17β-dihydroxyandrosta-1,4-dien-3-one γ-lactone melting at approximately 205–206° with decomposition. The product has the formula

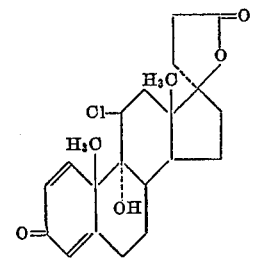

EXAMPLE 5

(A) *17α - (2 - carboxyethyl) - 17β - hydroxyandrosta-4,6,9(11)-trien-3-one γ-lactone.*—A mixture of 2 parts of 17α - (2 - carboxyethyl) - 17β - hydroxyandrosta - 4,9 (11)-dien-3-one γ-lactone, 4 parts of chloranil, and 112 parts of tert-butyl alcohol is heated at the boiling point under reflux with agitation for 5 hours. It is then cooled to room temperature and filtered. The filtrate is freed of solvent by distillation, and the oily residue is taken up in chloroform. The chloroform solution is consecutively washed with water, aqueous 5% sodium bicarbonate, and water. It is then dried over anhydrous sodium sulfate and freed of solvent by distillation, leaving an oil which is chromatographed on silica gel, using benzene and ethyl acetate as developing solvents. From an eluate comprising 10% ethyl acetate in benzene is obtained, upon evaporation of solvent, pure 17α-(2-carboxyethyl)-17β-hydroxyandrosta-4,6,9(11)-trien-3-one γ-lactone as an oil.

(B) *17α - (2 - carboxyethyl) - 9α,11α - epoxy - 17β - hydroxyandrosta-4,6-dien-3-one γ-lactone.*—A solution of 20 parts of 17α-(2-carboxyethyl)-17β-hydroxyandrosta-4,6,9(11)-trien-3-one γ-lactone and 13 parts of perbenzoic acid in 515 parts of anhydrous benzene is maintained at 5° for 72 hours and then let stand at room temperatures for 24 hours. The resultant mixture is filtered, and the filtrate is diluted with 320 parts of hexane. Precipitation occurs. The precipitate, collected on a filter and twice recrystallized from acetone, affords 17α-(2-carboxyethyl)-9α,11α - epoxy - 17β - hydroxyandrosta - 4,6 - dien - 3-one γ-lactone melting at approximately 305° with decomposition. The product has the formula

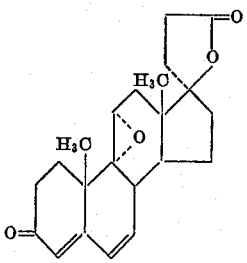

What is claimed is:
1. A compound selected from the group consisting of 9α,11α-epoxides of the formula

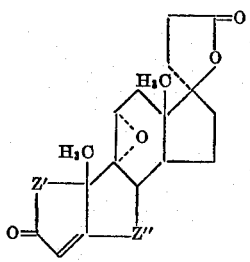

and corresponding halohydrins of the formula

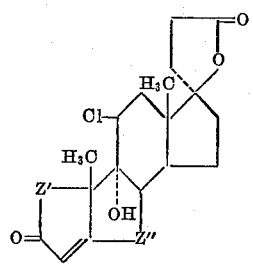

in which formulas one of Z′ and Z″ designates an ethylene radical and the other designates a member of the group consisting of ethylene and vinylene radicals.

2. 17α - (2 - carboxyethyl) - 9α,11α - epoxy - 17β - hydroxyandrost-4-en-3-one γ-lactone.

3. 17α - (2 - carboxyethyl) - 11β - chloro - 9α,17β - dihydroxyandrost-4-en-3-one γ-lactone.

4. 17α - (2 - carboxyethyl) - 9α,11α - epoxy - 17β - hydroxyandrosta-1,4-dien-3-one γ-lactone.

5. 17α - (2 - carboxyethyl) - 11β - chloro - 9α,17β - dihydroxyandrosta-1,4-dien-3-one γ-lactone.

6. 17α - (2 - carboxyethyl) - 9α,11α - epoxy - 17β - hydroxyandrosta-4,6-dien-3-one γ-lactone.

References Cited in the file of this patent

UNITED STATES PATENTS 2,925,416    Brown et al. _____ Feb. 16, 1960

OTHER REFERENCES

Chemical & Engineering News, vol. 37, No. 16, April 20, 1959, page 40.